Patented Aug. 14, 1934

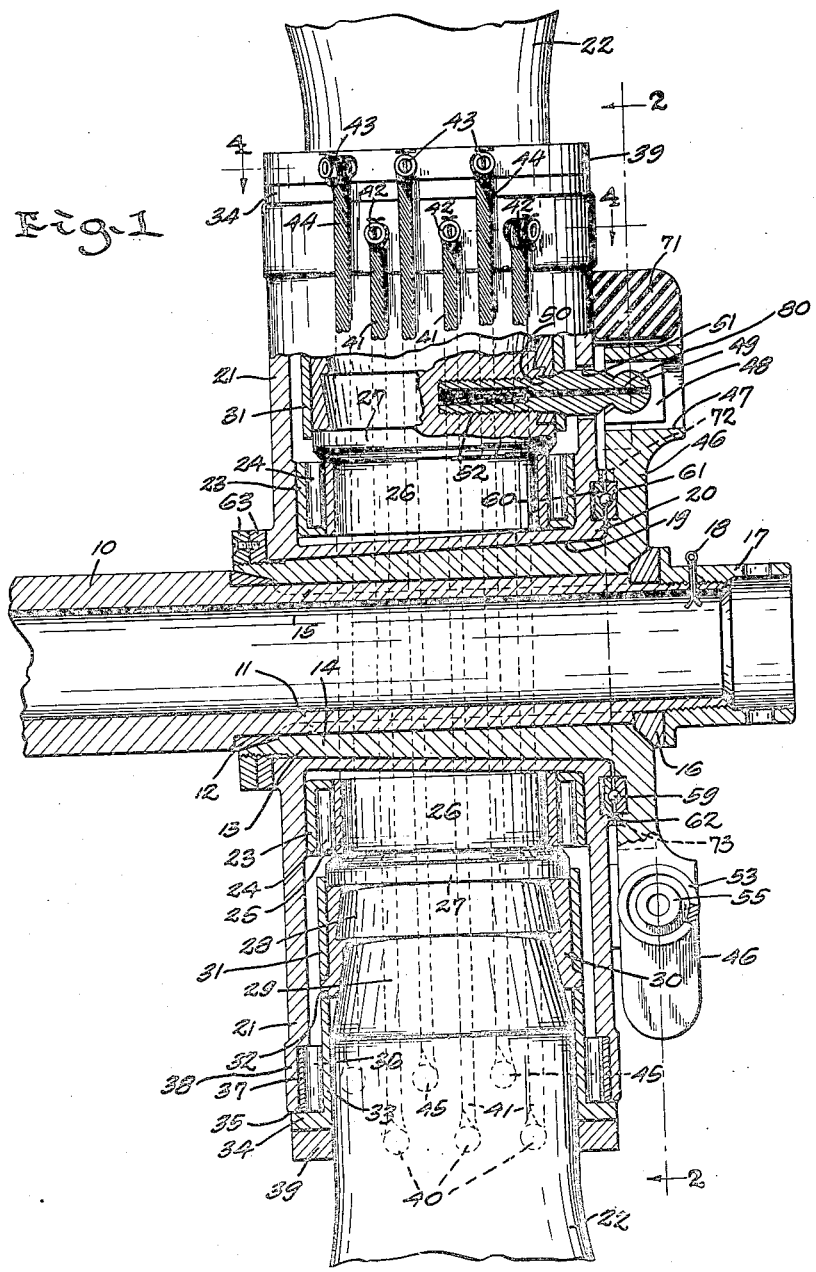

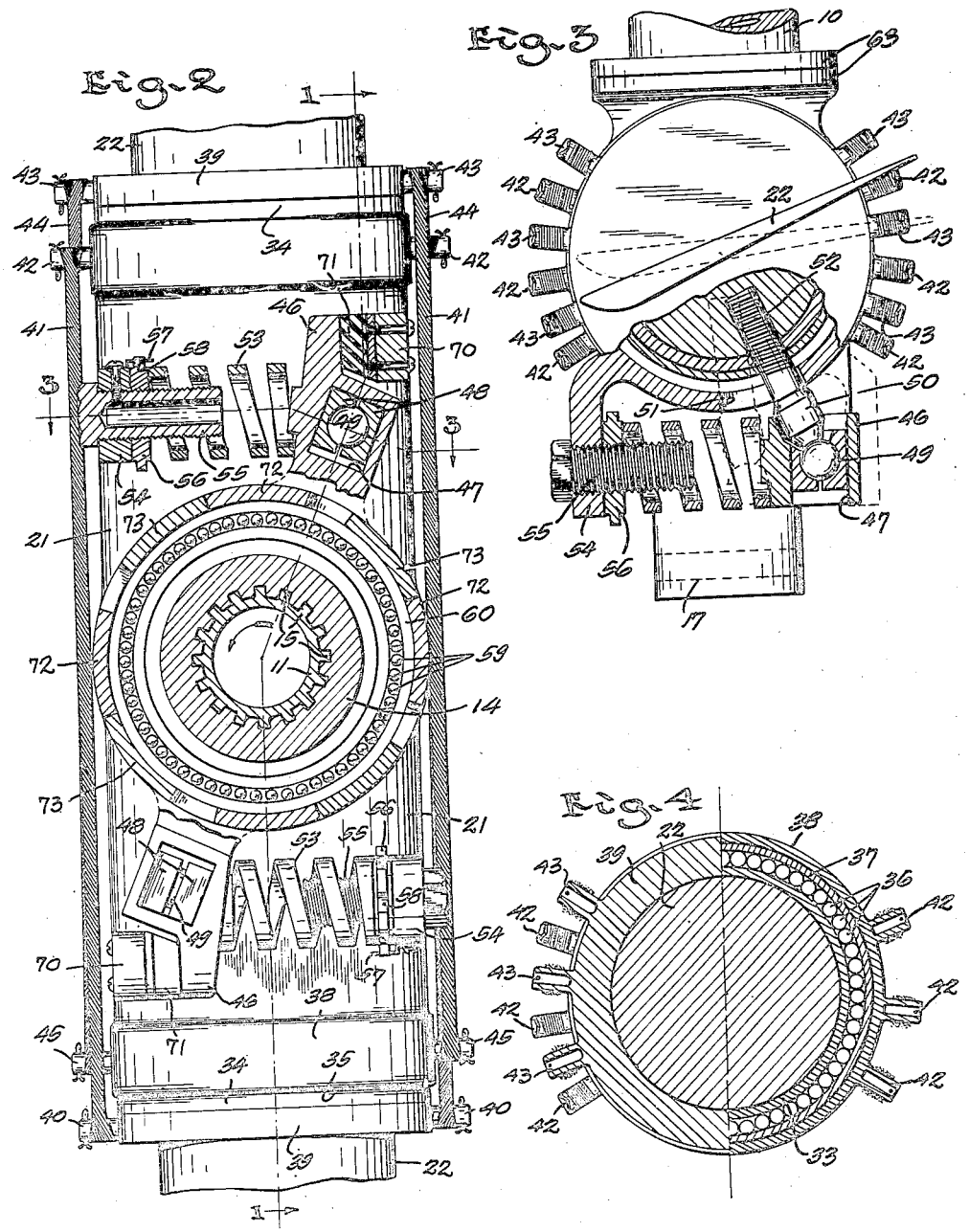

1,970,114

UNITED STATES PATENT OFFICE 1,970,114

AIRCRAFT PROPELLER

Albert P. Wiegand, Pittsburgh, Pa.

Application September 12, 1930, Serial No. 481,526

25 Claims. (Cl. 170—162)

This invention relates to aircraft propellers, and has for an object the provision of a simple and reliable construction whereby variable pitch of the propeller blades is positively effected through transmission of the torque forces developed by the propeller shaft to said blades for operating the same.

Another object of the invention is to provide a variable pitch propeller controlled by the torque developed by the propeller shaft, and wherein means are provided which operate to change the pitch of the blades of the propeller after a predetermined degree of torque forces is developed.

Still another object of the invention is to provide a variable pitch propeller in which the blades are arranged normally at a pitch greater than that of the ordinary fixed blade type of propeller, thereby rendering the propeller especially efficient at cruising speeds, and wherein the pitch of the blades is automatically decreased under certain conditions as when taking off or climbing, through development of increased motor torque, which is transmitted to the blades to effect the desired change in pitch.

Other objects and advantages of the invention will more fully be set forth and described in the specification and claims hereinafter following.

In the drawings accompanying and forming a part of this application, Figure 1 is a longitudinal sectional view through the improved propeller, showing parts thereof in elevation. Figure 2 is a vertical sectional view corresponding to the line 2—2 of Figure 1. Figure 3 is a sectional view corresponding to the line 3—3 of Figure 2, while Figure 4 is a composite sectional view corresponding to the line 4—4 of Figure 1.

As shown in the drawings the drive shaft 10, preferably hollow, is reduced as at 11, and provided with a split cone 12 for the reception of the inner end 13 of a sleeve 14, splined on the reduced portion 11 by splines 15, supported at its forward end by a cone 16 held in place by a cap nut 17 threaded upon the outer end of the shaft 10 and locked in position by a cotter pin 18. The sleeve 14 is thus mounted upon the shaft 10 for adjustment with respect to the cones 12 and 16.

The outer surface 19 of the sleeve 14 is outwardly tapered, and has rotatably mounted thereon a tapered member forming the hub of the propeller, and the hub 20 is provided with opposite radially extending blade sockets 21—21 adapted for the reception of oppositely disposed blades 22—22. Each blade socket 21 on its inner surface, substantially at the bottom, is provided with a cup 23 open at its outer end and carrying roller bearings 24 which are interposed between the inner surface of the circumferential wall of the cup 23 and a bearing ring 25 shrunk onto the butt end 26 of the associated blade 22, the blade outwardly of the ring being provided with an annular shoulder 27, and outwardly of the shoulder 27 with stepped tapered portions 28 and 29 adapted for accommodation of a split bearing ring 30 held in place by a ring 31 shrunk onto the halves of the bearing ring 30. The bearing ring 30 provides an annular shoulder 32 against which abuts a bearing ring 33, the outer end of which is provided with a flange 34 bearing against the outer surface 35 of the related blade socket 21, roller bearings 36 being interposed between the ring 33 and a ring 37 carried by the outer end 38 of the socket member 21. The outer surface of the flange 34 of the ring 33 bears against a ring 39 fixedly attached to the adjacent portion of the blade 22, and provided with a plurality of integral studs 40, at opposite sides, connected by flexible links 41, preferably of twisted piano wire, to similar studs 42 formed on the opposite hub socket 21. The ring 39 bearing upon the opposite hub socket 21 is provided with studs 43 to which are attached flexible links 44, the opposite ends of which are attached to studs 45 formed on the outer surface of the first mentioned socket 21. The links 41 and 44 support the blades 22—22 against outward longitudinal movement while permitting the required rotation of said blades.

The sleeve 14 at its outer end is provided with a pair of integrally formed radially extending transmitting arms 46—46, each having adjacent its outer end an aperture 47 for the reception of bronze shoes 48, spherically recessed for the reception of the spherical head 49 forming part of a stud 50 extending through a slot 51 in the wall of the adjacent socket 21, extending thence through the rings 30 and 31, and threaded into the body of the propeller blade base as indicated at 52, the studs and shoes in each case being lubricated by a wick 80 extending through each stud. Movement of each of the arms 46—46 is opposed by a spring 53 bearing thereagainst and having its opposite end abutting a lug 54 formed on the wall of the hub socket, the spring 53 being supported and adjustably mounted through the provision of a set screw 55 threaded through the lug 54 and having threaded on its inner end a follower 56 bearing against the spring 53. The follower may be locked in position by a spring dog 57 engaging notches 58 at the outer periphery of the follower 56. Each socket member 21 is also provided with a lug 70 carrying a rubber pad 71 forming an abutment for the end portion of the arm 46 opposite that engaged by the spring 53.

Interposed between the inner surfaces of the arms 46 and adjacent surfaces of the socket members 21—21 is a series of ball bearings 59 carried by split race members 60 and 61, a plurality of liners 62 being interposed between the race ring 60 and adjacent surfaces of the hub members. The hub 20 is adapted to be adjusted longitudinally with reference to the sleeve 14 by means of nuts 63. Lugs 72 are provided upon the arms 46 and lugs 73 upon the adjacent hub sockets 21 for the purpose of limiting movement of the arms 46 with reference to the hub sockets 21, so that in event of failure of the connections between the outer ends of the arms and the blades, these lugs interengage and limit relative movement between the parts.

In operation, when the propeller is at rest the springs 53 bearing upon the arms 46 hold the blades at their maximum pitch, which is designed to be greater than that of the pitch of ordinary fixed blade propellers. When the motor is started and the shaft 10 begins to rotate, up to a certain degree of torque forces developed by the motor and shaft 10 with respect to the propeller, the blades will remain at their maximum pitch; however, in taking off, and in climbing, for instance, the torque forces developed are materially increased, and transmitted through the arms 46, become powerful enough to overcome the resistance offered by the springs 53, and the arms 46 begin to move with reference to the hub 20 and blade socket members 21—21, carrying therewith the stud members 50 in opposite directions and bring about rotation of the blades 22—22 in opposite directions to decrease the pitch of said blades, the amount of decrease in pitch being governed of course by the degree of torque forces developed, and by the opposing strength exerted by the springs 53, which latter may be adjusted as desired. Upon reaching a cruising status, the load is reduced, and the torque forces transmitted through the arms 46—46 to the blades and tending to compress the springs 53 correspondingly reduced, and the springs 53 will then act to return the blades 22 toward, or entirely to, the maximum pitch positions. The end thrusts upon the blades 22 are taken up by the links 41 and 44 which permit the rotatable movement of the blades 22. These links also act in opposition to the torque forces heretofore mentioned; that is, the normal position of the links 41 and 44, when the propeller blades 22 are at their maximum pitch, is parallel, or substantially so to the longitudinal axes of the blades 22—22; when the blades are rotated toward decreased pitch position the links 41 and 44 assume inclined positions with reference to said axes; consequently centrifugal forces acting upon the links tend to maintain them in their parallel positions, and thus said links augment the forces exerted by the springs 53, tending to maintain the blades at their maximum pitch position.

Thus it will be appreciated that the torque forces developed by the motor and shaft 10 are positively transmitted to the blades to control the pitch positions thereof; that the pitch angles are not decreased until a predetermined increase of torque forces has been developed sufficient to overcome the combined opposed forces exerted by the springs 53 and links 41 and 44; and that the control of the pitch of the blades is automatically effected.

It will be appreciated that the embodiment herein illustrated accomplishes at least the principal object of the invention; it will also be apparent that advantages other than those herein particularly referred to are inherent in the construction, and it will be understood that various changes and modifications may be made without departing from the spirit of the invention; and accordingly the embodiment herein disclosed is illustrative only and the invention is not limited thereto.

I claim:

1. An aircraft propeller adapted to be secured to a driving shaft, and comprising: a hub having radially disposed blade sockets aligned with each other and located upon opposite sides of said hub, opposed blades mounted in said sockets for rotation and longitudinal movement; inextensible links connecting said blades to the outside of said hub and holding said blades against centrifugal ejection while permitting limited rotation of each blade in its socket, and means depending for operation upon the degree of torque developed by said shaft for automatically rotating each of said blades in its socket.

2. An aircraft propeller adapted to be secured to a driving shaft, and comprising: a hub having radially disposed blade sockets aligned with each other and located upon opposite sides of said hub, opposed blades mounted in said sockets for rotation and free longitudinal movement; inextensible links located outside of said sockets, substantially parallel to the axes of said sockets and connected to said blades whereby centrifugal ejection of the same is prevented, said links normally tending to hold said blades in predetermined position under the influence of centrifugal force when said hub is rotated; said hub being angularly movable around the shaft axis, and means depending for operation upon the degree of such movement between said hub and shaft for overcoming the directive influence of said links and rotating said blades in their respective sockets.

3. An aircraft propeller adapted to be secured to a driving shaft, and comprising: a hub having radially disposed blade sockets aligned with each other on opposite sides of said hub, and opposed blades mounted in said sockets for rotation and free longitudinal movement; inextensible links connecting said blades and permitting limited rotation thereof; means for supporting said hub for angular movement about said shaft relative to the shaft axis, a transmitting member rigidly secured to said shaft to rotate therewith, connecting means interposed between said transmitting member and the shank of each blade adapted to turn said shanks in their sockets in opposite directions upon relative rotation of said hub and transmitting member, and a yielding element interposed between said transmitting member and said hub whereby relative movement between the same is prevented until a predetermined degree of torque is produced.

4. An aircraft propeller adapted to be secured to a driving shaft, and comprising: a hub having radially disposed blade sockets aligned with each other on opposite sides of said hub, and opposed blades mounted in said sockets for rotation and longitudinal movement; inextensible links connecting said blades and permitting limited rotation thereof in their respective sockets, means other than said links yieldingly opposing the rotation of said blades in their sockets, and a transmitting member rotatable with said shaft and tending to turn said blades in said sockets in opposition to said yielding means, said hub being angularly movable about the axis of said shaft against the effect of said yielding means.

5. In an aircraft propeller, a sleeve, means rigidly securing said sleeve to the driving shaft of an aircraft engine, a hub coaxial with said sleeve and angularly movable relative thereto, a blade having a shank projecting angularly from said hub, means compelling said blade to rotate with said hub while permitting angular adjustment of said blade about its own axis, means including an inherently yieldable element for compelling said hub to accompany the rotation of said sleeve, and motion transmitting means operatively connecting said sleeve and said blade whereby said blade is moved angularly relative to its own axis upon angular movement of said hub relative to said sleeve.

6. An aircraft propeller comprising, in combination, a sleeve, means for securing said sleeve rigidly to the shaft of an aircraft engine to rotate therewith, a hub rotatably mounted on said sleeve and having radiating sockets, a blade having a shank mounted in each socket and angularly movable about the socket axis, tension means located outside of each socket and operatively engaging said blades for holding said blades in said sockets against centrifugal force, connections between each blade shank and said sleeve whereby relative rotation of said hub and sleeve rotates said blades in their sockets, means yieldingly fixing the positions of said blades in their sockets, and a yielding connection between said blades compelling one to rotate with the other until a predetermined torque is reached.

7. An aircraft propeller comprising in combination: a sleeve, means for securing said sleeve to the driving shaft of an aircraft engine, a hub coaxial with said sleeve, means permitting limited relative angular movement of said hub relative to said sleeve about the axis of said shaft, a blade carried by said hub and rotatably mounted to permit variation in the pitch of said blade, and means connecting said blade and sleeve; operable to drive said hub, said means depending for operation upon the relative movement between said hub and sleeve for automatically controlling the pitch of said blade.

8. An aircraft propeller comprising in combination: a sleeve, means for rigidly securing said sleeve to the driving shaft of an aircraft engine, a hub coaxial with said sleeve and angularly movable relative thereto, means positively limiting relative angular movement between said hub and sleeve, a blade carried by said hub and rotatably mounted to permit variation in the pitch of said blade, and means depending for operation upon the relative movement of said sleeve and hub to effect rotation of said blade and thus automatically control the pitch of said blade.

9. An aircraft propeller comprising in combination: a sleeve, means for securing said sleeve to the driving shaft of an aircraft engine, a hub coaxial with said sleeve and angularly movable relative thereto, a blade carried by said hub and rotatably mounted to permit variation in pitch of said blade, and means carried by said sleeve for positively transmitting variations in torque forces developed by said shaft to effect rotation of said blade and thus automatically control the pitch of said blade.

10. An aircraft propeller comprising: a two-part hub, means for securing one part of said hub to the driving shaft of an aircraft engine, the other part of said hub being angularly movable relative to said first part about the axis of said shaft, a blade carried by the last named part of said hub and rotatably mounted to permit variation in pitch of said blade, means carried by the other part for positively transmitting variations in torque forces developed by said shaft to effect rotation of said blade in one direction, and yieldable means opposing the torque forces tending to rotate said blade in the opposite direction.

11. An aircraft propeller comprising in combination: a sleeve, means for securing said sleeve to the driving shaft of an aircraft engine, a hub coaxial with said sleeve and angularly movable relative thereto about the axis of said shaft, radial socket members carried by said hub, blades rotatably mounted in said socket members, tension members secured to said blades and located outside of said socket members whereby said blades are held in their sockets, and operative connections between said blades and said sleeve whereby the pitch of said blades is caused to change upon relative angular movement between said sleeve and hub.

12. An aircraft propeller comprising in combination: a two part hub, the parts of said hub being coaxial with each other, means for securing one part of said hub to the driving shaft of an aircraft engine, said hub having a plurality of radial socket members, a blade rotatably mounted in each socket member, a plurality of inextensible tension members located outside of each socket member and connected to each blade whereby such blade is held in its socket member, a stud carried by each blade shank and projecting through an aperture in the corresponding socket, and interengaging connections between each stud and the other part of said hub whereby said blades are caused to turn together.

13. An aircraft propeller comprising in combination: a hub having radial projecting hollow socket members, blades carried by said hub having shanks rotatably mounted in said socket members, and means securing said blades in said socket members against centrifugal force, such means comprising straight inextensible tension members located outside of said socket members, one end of each tension member being connected to a blade shank beyond the end of each socket member and the opposite end of each tension member being secured to a part of said hub, all of said tension members being substantially parallel to each other.

14. An aircraft propeller comprising in combination: a hub having radial projecting hollow socket members, blades carried by said hub having shanks rotatably mounted in said socket members, and means securing said blades in said socket members against centrifugal force, such means comprising straight inextensible tension members located outside of said socket members, one end of each tension member being connected to a blade shank beyond the end of each socket member and the opposite end of each tension member being secured to a part of said hub, all of said tension members being substantially parallel to each other, each blade being asymmetrical relative to the axis of its shank whereby the air thrust of its trailing edge tends to rotate said blade about that axis and said tension members being substantially parallel to the shank axis when the angularity of the blade is a maximum.

15. An aircraft propeller comprising in combination: a hub having opposed radial socket members, blades having shanks rotatably mounted in said socket members, and a plurality of straight inextensible tension members arranged around said socket members and holding said blades in their sockets, alternate tension members having their ends connected to the shanks of opposite blades, and the other ends of said tension members being connected to exterior portions of said hub, all the tension members which are attached to each blade being substantially parallel to each other.

16. An aircraft propeller comprising in combination: a hub, extensional radial socket members projecting from said hub, blades having shanks rotatably located in said socket members, tension members outside of said hub securing said blades in their sockets against centrifugal force, each of said tension members consisting of a substantially inextensible element having one end fastened to a blade and its opposite end fastened to a part of the propeller opposite to that blade, a sleeve element mounted for angular movement coaxial with said hub, an interengaging means between said sleeve element and each blade whereby said blades are compelled to rotate together.

17. In an aircraft propeller, in combination, a hub, radial socket members projecting from said hub, blades carried by said hub and having shanks slidably mounted in said socket members, tension members outside of said hub, each tension member having one end secured to a blade shank and the other end secured to a part of the propeller opposite thereto, all of said tension members being substantially straight and parallel to each other, a radial stud projecting from each blade shank and having a spherical head, a sleeve element coaxial with said hub and angularly movable relative thereto about their common axis, said sleeve element having radial slideways therein, and split shoes movably located in said slideways, said shoes having spherical cavities therein receiving the heads of said studs.

18. An aircraft propeller comprising in combination: a two part hub, means securing one part of said hub to the shaft of an aircraft motor, the other part of said hub being angularly movable relative to the first part, a plurality of radial socket members carried by one part of said hub, the other part having an equal number of radial recesses, blades having shanks rotatably mounted in said sockets, tension means secured to said blade and located outside of said sockets for retaining said blades in their sockets in opposition to centrifugal force, a rigid stud carried by each shank and projecting into one of said slots, each stud having a spherical head, and a split shoe slidably mounted in each slot and having a spherical recess receiving the head of the corresponding stud.

19. An aircraft propeller, comprising: a drive shaft; a hub cooperating with said drive shaft; a blade extending radially from said hub and mounted for rotation about its longitudinal axis; and connecting means between said shaft and said blade and operable to drive said hub, said connecting means having a yieldable member interposed therein to permit relative movement between said hub and said shaft for altering the pitch of said blades.

20. An aircraft propeller, comprising: a drive shaft; a hub rotatably carried by said drive shaft; a blade extending radially from said hub and mounted for rotation about its longitudinal axis; and connecting means between said shaft and said blade, and having a yieldable member interposed therein to drive said hub, said yieldable member being yieldable to permit relative movement between said hub and said shaft for altering the pitch of said blade, the degree of yielding of said yieldable member being dependent upon the degree of torque developed by said shaft.

21. An aircraft propeller, comprising: a drive shaft; a hub cooperating with said drive shaft; a blade extending radially from said hub and mounted for rotation about its longitudinal axis; and means for driving said blade at varied pitch angles, said means being affected by the variations in torque developed by said shaft, and initially driving said blade at a high pitch angle under one torque, and driving said blade at a lower pitch angle upon increase in the torque.

22. An aircraft propeller, comprising: a drive shaft; a hub rotatably carried by said drive shaft; a blade extending radially from said hub and mounted for rotation about its longitudinal axis; connecting means between said shaft and said blade, and having a yieldable member interposed therein to drive said hub, said yieldable member being yieldable to permit relative movement between said hub and said shaft for altering the pitch of said blade, initially holding said blade at a high pitch angle, the degree of yielding of said yieldable member being affected by the torque forces developed by said shaft, whereby said blade is initially driven at a high pitch angle under one torque force, and is driven at a lower pitch angle under increase in the torque force.

23. An aircraft propeller, comprising: a drive shaft; a hub rotatably carried by said drive shaft and having a plurality of blade sockets; a blade rotatably mounted in each of said blade sockets; elements extending outside of said hub, connecting said blades to said hub, holding said blades in their sockets against centrifugal ejection; and connecting means between said shaft and said blade and operable to drive said hub, said connecting means having yieldable members interposed therein to permit relative movement between said hub and said shaft for altering the pitch of said blades.

24. An aircraft propeller, comprising: a drive shaft; a hub rotatably carried by said drive shaft and having a plurality of blade sockets; a blade rotatably mounted in each of said blade sockets; elements connecting said blades to said hub, holding said blades in their sockets against centrifugal ejection; and connecting means between said shaft and said blade, and having yieldable members interposed therein to drive said hub, said yieldable members being yieldable to permit relative movement between said hub and said shaft for altering the pitch of said blades, the degree of yielding of said yieldable members depending upon the degree of torque developed by said shaft.

25. An aircraft propeller, comprising: a drive shaft; a hub carried by said drive shaft and having a plurality of blade sockets; a blade rotatably mounted in each of said blade sockets; elements connecting said blades to said hub, and mounted to permit rotation of said blades in said hub about their longitudinal axes, to vary the pitch of said blades, and operable to hold said blades in said sockets against centrifugal ejection; and means, depending for operation upon the degree of torque developed by said shaft for driving said blades, said means initially driving said blades at a high pitch under one degree of torque, and driving said blades at a lower pitch upon increase in the degree of torque.

ALBERT P. WIEGAND.